United States Patent [19]

Culp

[11] Patent Number: 5,068,566

[45] Date of Patent: Nov. 26, 1991

[54] ELECTRIC TRACTION MOTOR

[75] Inventor: Gordon W. Culp, Van Nuys, Calif.

[73] Assignee: Rockwell International Corporation, El Segundo, Calif.

[21] Appl. No.: 532,837

[22] Filed: Jun. 4, 1990

[51] Int. Cl.⁵ ............................................. H01L 41/08
[52] U.S. Cl. ..................................................... 310/328
[58] Field of Search ......................................... 310/328

[56] References Cited

U.S. PATENT DOCUMENTS

| 4,613,782 | 3/1985 | Mori et al. | 310/323 |
| 4,714,855 | 12/1987 | Fujimoto | 310/328 |
| 4,736,132 | 4/1988 | Culp | 310/328 |
| 4,928,030 | 5/1990 | Culp | 310/328 |

FOREIGN PATENT DOCUMENTS

| 0002691 | 1/1979 | Japan | 310/328 |
| 0059980 | 4/1985 | Japan | 310/328 |
| 0219972 | 11/1985 | Japan | 310/328 |
| 0180583 | 8/1986 | Japan | 310/328 |
| 0085681 | 4/1987 | Japan | 310/328 |
| 0085682 | 4/1987 | Japan | 310/328 |
| 0259764 | 10/1989 | Japan | 310/323 |
| 0569980 | 8/1977 | U.S.S.R. | 310/328 |
| 0591975 | 2/1978 | U.S.S.R. | 310/328 |

Primary Examiner—Mark O. Budd
Assistant Examiner—Thomas M. Dougherty
Attorney, Agent, or Firm—H. Fredrick Hamann; Harry B. Field; John McFarren

[57] ABSTRACT

An electric traction motor provides forcible rotary or linear positioning of a motor shaft by pairs of actuators that are electrically stimulated to produce tractive cyclical walking. Smooth walking actuators provide high mechanical efficiency and long life by eliminating sliding friction. The actuators are stimulated by a high efficiency electrical drive system to position relatively large-area traction members that match the speed of the motor shaft. The preferred embodiment comprises piezoelectric actuators having layers of shear deformation piezoelectric material. Conventional bearings and lubrication are not required, and embodiments of the motor can be constructed to operate satisfactorily in intense magnetic fields and severe ionizing radiation. The traction motor can range in scale from microscopic to very large, and positioning accuracy on the order of nanometers has been demonstrated.

16 Claims, 1 Drawing Sheet

ELECTRIC TRACTION MOTOR

TECHNICAL FIELD

The present invention relates to electric devices and, in particular, to an electric traction motor that uses pairs of cyclical smooth walking actuators to produce linear or rotary motion.

BACKGROUND OF THE INVENTION

Conventional electromagnetic motors generally require provisions for removal of heat. Heat is produced in electric motors and generators by electrical resistance and the sliding friction of slip rings, brushes, and commutators that transmit power between fixed and rotating structures. The conduction of even moderate currents through sliding contacts repeatedly welds and breaks the contacts, causing a continual rearrangement of conducting material. As a result, contact surfaces become rougher with continued use. Brushes, which have a relatively small contact surface area, generally wear out faster than rings. These characteristics of resistive heating, contact welding, and short lifetime of motor parts make conventional electric motors unsatisfactory in some applications and environments. Thus, there is a need for motors having improvements in weight, efficiency, and reliability that are important considerations for applications in hostile environments, such as outer space.

The limitations of electric motors in hostile environments have led to the investigation of alternative types of transducers, actuators, and motors. Piezoelectric actuators, for example, comprising dimorphs of two piezoelectric layers have been described in the following copending U.S. patent applications, which are incorporated herein by reference: Ser. No. 252,197 filed Sept. 30, 1988, and Ser. No. 512,286 filed Apr. 20, 1990. A dimorph is a piezoelectric cell having two layers of piezoelectric shear material with a common central electrode and outer ground electrodes. With the bottom ground electrode fixed to a base, an electric potential applied to the common electrode causes translation of the top ground electrode with respect to the bottom electrode. This piezoelectric translation vector, or stroke, is determined by the direction and strength of the polarizations of the piezoelectric layers, the thicknesses of the piezoelectric layers, and the magnitude and polarity of the applied electric potential. A desired stroke vector can be obtained by selecting an appropriate combination of piezoelectric materials, polarization vectors, layer thicknesses, and electric potential. Because the dimorph has outer ground electrodes, a plurality of dimorphs may be stacked without regard to the electrical state of adjacent material. Piezoelectric shear activation allows bipolar electric drive that doubles the mechanical stroke relative to the stroke available from thickness mode or extension mode activation. Furthermore, shear deformation is 2-dimensional, which allows piezoelectric dimorphs to be affixed to non-deforming surfaces without incurring internal stresses.

Piezoelectric actuators can be constructed of stacked segments to provide a three-dimensional mechanical output. By combining cyclically alternating traction strokes of two or more actuators, walking motion can be produced. "Smooth walking" actuator motion requires non-sinusoidal stroke wave forms to match actuator speed to the surface speed of the positioned object. An electrical system for driving smooth walking actuators is disclosed in copending U.S. application Ser. No. 488,548 filed Mar. 5, 1990, which is incorporated herein by reference. In such a system, each segment of an actuator is connected to an electrical controller by a separate electrical loop. The electrical controller provides a separate resonant electrical signal on each loop to stimulate each segment of the transducer. Each segment reacts to the resonant electrical stimulation on its loop. In general, changes in cosine amplitudes control force while changes in sine amplitudes control speed. Because the segments are coupled together, the overall output of the actuator comprises the vector sum (neglecting coupling effects) of the output reactions of the individual segments of the actuator. Thus, each actuator loop is stimulated electrically by a unique combination of frequency, amplitude, phase, and polarity determined by Fourier mechanical summing to produce a stroke having a predetermined, generally non-sinusoidal wave form.

SUMMARY OF THE INVENTION

The present invention comprises an electric traction motor that moves an object by cyclical smooth walking of pairs of traction actuators. The traction motor provides forcible rotary or linear positioning of a motor shaft by tractive cyclical walking of the actuators pairs. The motor produces high torque, or force, at low RPM, or IPS, for the rotary or linear embodiment, respectively. The linear embodiment may replace hydraulic actuators in systems that require low weight and the absence of actuating fluids. Embodiments can be constructed to operate satisfactorily in intense magnetic fields or severe ionizing radiation. Traction motors of the present invention can range in scale from microscopic to very large, and positioning accuracy on the order of nanometers has been demonstrated.

By way of example and not limitation, the traction motor of the present invention may utilize piezoelectric actuators, electromagnetic actuators, magnetostrictive actuators, or thermal expansion devices. All preferred embodiments use an even number of actuators in smooth walking pairs. Smooth walking actuators provide high mechanical efficiency and long life by eliminating sliding friction. Relatively large area traction members are positioned by the actuators when they are stimulated by a high efficiency electrical drive system. The preferred embodiment comprises piezoelectric actuators having layers of shear deformation piezoelectric material. Conventional bearings are not required in any of the embodiments.

BRIEF DESCRIPTION OF THE DRAWINGS

For a more complete understanding of the present invention and for further advantages thereof, the following Description of the Preferred Embodiments makes reference to the accompanying Drawings, in which the same reference numerals indicate the same or similar components in the several Figures, and in which.

DETAILED DESCRIPTION OF THE PREFERRED EMBODIMENTS

Figure 1:
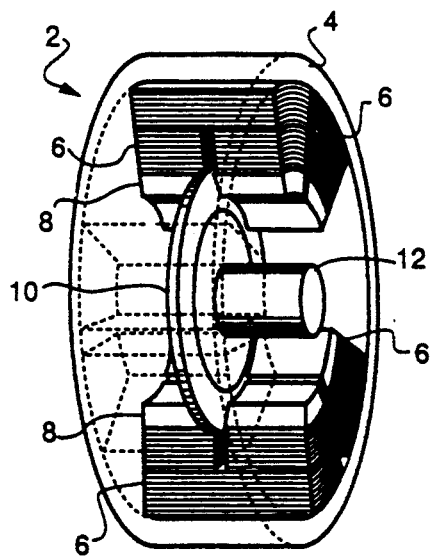
FIG. 1 is a semi-transparent perspective view of a rotary traction motor of the present invention.

FIG. 1 is a partially transparent perspective view of a rotary traction motor 2 of the present invention. Motor 2 comprises a cylindrical housing 4, a plurality of actuators 6 attached to the interior surface of housing 4, a traction member 8 attached to the end of each of the plurality of actuators 6, a disk-shaped rotor 10 engaged by actuators 6, and a motor shaft 12 attached to rotor 10 and extending from housing 4. Rotor 10 may be a simple flange on shaft 12. In a linear embodiment, the flange may be in the form of a rib or spine extending along the shaft. In the preferred embodiment of rotary motor 2, at least three pairs of actuators 6 engage rotor 10. Although the preferred embodiments of the present invention, including traction motor 2, use piezoelectric actuators, the principles are equally applicable to other actuating devices, such as electromagnetic actuators, magnetostrictive actuators, and thermal expansion devices, for example. For reasons of practicality, but not limitation, the present invention is described primarily in terms of the preferred piezoelectric actuators. Also, because they are well known in the art, electrical connections to the actuators and housing seals to exclude dirt are omitted from the drawings for clarity. In the transparent portion of FIG. 1, additional actuators 6 are illustrated in phantom.

Figure 2:
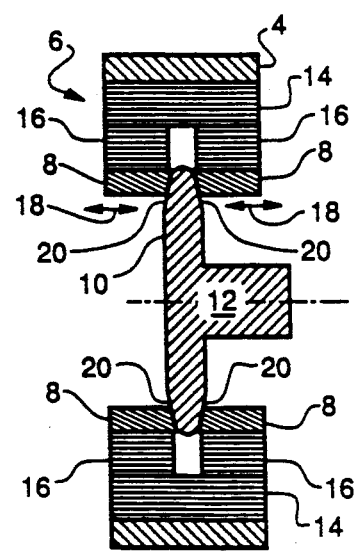
FIG. 2 is a cross sectional view of the motor of FIG. 1.

FIG. 2 is a cross sectional view of traction motor 2 taken along the axis of rotation of shaft 12 and rotor 10. FIG. 2 shows an actuator 6 attached to housing 4, traction members 8 attached to actuator 6, and rotor 10 engaged by traction members 8. Actuator 6 comprises a tangential actuating piezoelectric portion 14, hereinafter referred to as tangenter 14, and a pair of axial actuating piezoelectric portions 16, hereinafter referred to as axiers 16. Traction members 18 are positioned by axiers 16 to grip and release rotor 10 in vise-like fashion. Axiers 16 are affixed to and positioned by tangenter 14 without intervening structural members. Tangenter 14 is affixed to the inner surface of housing 4. Rotor 10 includes traction surfaces 20 that may comprise two opposing cone segments concentric with the shaft axis indicated by the dashed center line. Axiers 16 comprise layers of cylindrical segments of piezoelectric material polarized in shear. Traction members 8 are movable in directions 18 upon application of an appropriate electric potential to axiers 16. Axiers 16 generally are activated in unison but with opposite stroke directions to grip rotor 10. Alternatively, axiers 16 may be activated independently by separate electrical potentials in accordance with the requirements of a particular application. With at least three pairs of approximately equally angularly spaced actuators 6, axiers of alternate actuators can grip traction surfaces 20 to position and rotate rotor 10 which axiers of the remaining actuators can release rotor 10 and execute the retracing portion of the walking motion.

Figure 3:
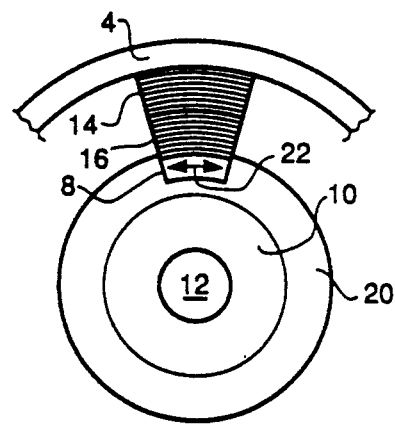
FIG. 3 is an end view of a portion of the motor of FIG. 1.

FIG. 3 is an end view of a portion of radial traction motor 2 illustrating only one actuator 6. As shown in FIG. 3, tangenter 14 comprises nested cylindrical layer segments of piezoelectric material polarized in shear. The application of appropriate electrical potentials to the layers of tangenter 14 positions traction members 8 in the directions indicated by arrows 22. The arced layers of tangenter 14 function to rotate traction members 8 in a small arc about the axis of motor shaft 12.

Rotary motor 2 illustrated in FIGS. 1 through 3 operates by the simultaneous application of predetermined time-varying electrical potentials to all tangenters and axiers of actuators 6. Smooth walking motion of actuators 6 is achieved by application of Fourier electric drive signals that produce shear deformation of the piezoelectric layers of actuators 6. Smooth walking comprises the cyclical steps of actuator traction, lift-off, retrace, recontact, and traction again. Traction members 8 contact tractive surfaces 20 without sliding friction and deliver smooth torque to shaft 12.

Figure 4:
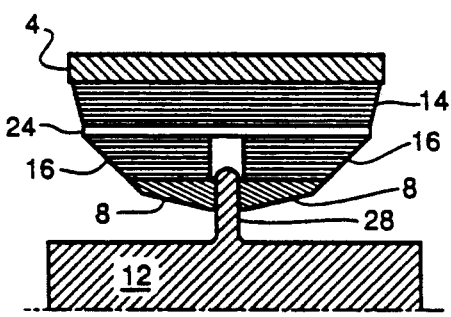
FIG. 4 is a partial cross sectional view showing an alternative embodiment of the motor of FIG. 2.

FIG. 4 is a quarter section of radial motor 2 illustrating a preferred embodiment in which housing 4 is relatively wide and tangenters 14, axiers 16, and traction members 8 are tapered toroidally to distribute the piezoelectric operating forces over a relatively large area. The relatively large surface width of tangenter 14 at the attachment to housing 4 minimizes tensile stresses induced in the piezoelectric material by externally applied shaft forces.

In the embodiment of FIG. 4, annular planar traction surfaces 28 of shaft 12 are parallel, thus allowing two radial shaft movements orthogonal to the shaft axis. The plane of the traction contact surface is perpendicular to the line of action of axiers 16, so that sliding does not occur when the axiers are activated to apply gripping force to surfaces 28 for the traction portion of the walking cycle. Conventional bearings are not require because shaft positioning and rotation are controlled piezoelectrically. The embodiment of FIG. 4 requires some external means (not shown) for maintaining radial alignment. Otherwise, excessive radial alignment errors can introduce rubbing at traction contact points. Each actuator may include a radial-acting portion (not shown) that provides shaft centering by electrical control.

Figure 5:
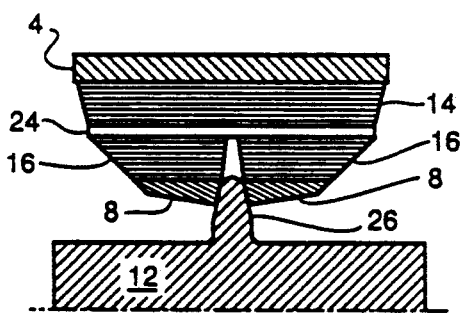
FIG. 5 is a partial cross sectional view showing a second alternative embodiment of the motor of FIG. 2.

FIG. 5 illustrates an embodiment of radial traction motor 2 intended for relatively large shaft forces. This embodiment combines some of the characteristics of the embodiments illustrated in FIGS. 2 and 4 to distribute large forces over a relatively large structural support area, thereby reducing stress. Piezoelectric materials, which commonly comprise ceramics having relatively low tensile strength, can be further protected from excessive tensile stress by the addition of a tension distribution member 24. Traction surface 26 of shaft 12 is tapered to direct the normal force of traction contact at an angle through the piezoelectric material of the actuators. A predetermined angle changes tensile loading to compressive loading, which is more easily borne by brittle materials. During motor operation, approximately half of the actuators grip, align, rotate, and position the shaft, thus performing the function of conventional shaft bearings but with zero clearance, relatively high rigidity, and no rubbing.

Some rubbing occurs when traction contact is made and broken in embodiments of the invention that use a traction contact plane that is not perpendicular to the axier line of action. This contact onset rubbing increases with increasing rotor bevel angle and with decreasing structural rigidity of the motor as a whole. In practice, bevel angles can be made large enough to insure radial kinematic rotor stability, but small enough to render contact onset rubbing negligible.

Figure 6:
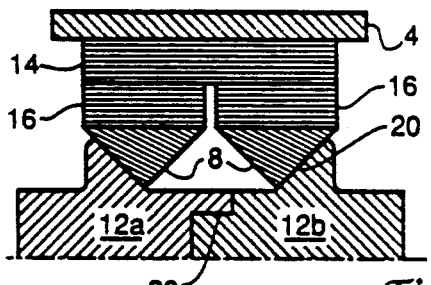
FIG. 6 is a partial cross sectional view of an embodiment of the present invention that predominantly compresses its actuators during operation.

FIG. 6 illustrates an embodiment of rotary motor 2 in which the normal force vectors due to shaft gripping by axiers 16 converge on and maintain compression on the interior of the actuator body. Since the actuator body is compressed, there is no need for tension distributor 24 as in the embodiments of FIGS. 4 and 5. Elimination of tension distributor 24 lightens and stiffens the actuators, thus providing faster cycling and greater power.

As illustrated in FIG. 6, shaft 12 may be split along surfaces 30 into two parts, 12a and 12b, to facilitate motor assembly. Tangenter 14 comprises cylindrical segments that force the shaft tangentially with a succession of short circular arc segment strokes that minimize rubbing. Conical contact surfaces 20 of shaft 12 are illustrated at a relatively large angle relative to the shaft axis. This configuration favors relatively great actuator body compression but results in a small amount of contact onset rubbing. Smaller angles for surfaces 20 reduce rubbing, but the width of housing 4 and the attached portion of tangenter 14 may have to be increased to preclude tensile forces in the actuator body.

Figure 7:
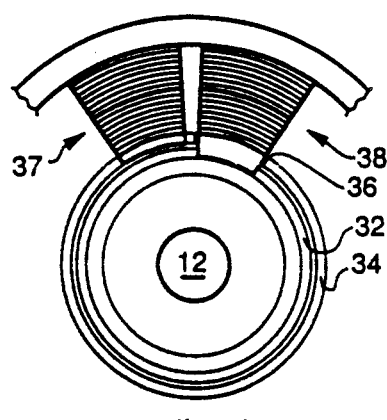
FIG. 7 is a partial end view of an embodiment of the present invention comprising ring springs for actuator compressive preloading.

FIG. 7 is an perspective view of a portion of radial traction motor 2 illustrating a pair of actuators 37 and 38. In the embodiment of FIG. 7, the traction members of each of two sets of alternating actuators are joined together and to a compression ring, one compression ring for each set of alternating actuator. For example, odd actuators 37 are joined to a common compression ring 32, and even actuators 38 are joined to a common compression ring 34. Holes 36 in ring 34 allow the connection of actuator 38 to ring 32 through ring 34. The clearance around hole 36 is greater than the stroke of the actuator plus the deflection caused by the largest anticipated externally applied shaft force. Each ring is placed in motor 2 under compression during initial assembly. Distortion of each ring compresses the corresponding piezoelectric material of the connected actuators radially outward toward housing 4. The use of a predetermined amount of actuator compression by ring preloading precludes tensile stresses on actuator body materials when an otherwise unsafe operating condition is encountered. Other preloading techniques obvious to those skilled in the art may be used without departing from the scope of the present invention.

It should also be obvious to those skilled in the art that the basic principles of rotary motor 2 are equally applicable to linear embodiments. For example, FIGS. 4, 5, and 6 may be viewed as cross sections of linear traction devices with ribs or spines extending along the length of shaft 12 (i.e., perpendicular to the plane of the drawings). The ultimate stroke of a linear traction motor is limited only by the extent of the shaft traction surface. Linear motors require planar actuator elements, a manufacturing benefit, to avoid rubbing during smooth walking. All of the embodiments of the present invention distribute normal force over the preponderance of the traction area, resulting in minimum contact pressure. Reduced contact pressure, given a specified normal force, extends the operating life of the traction surfaces.

The present invention operates in inert atmospheres and in a vacuum without contamination because no lubricants are used. The linear thermal expansion of piezoelectric ceramics is low relative to that of materials commonly used for motor structural members. Applications of the motor requiring relatively low weight will use a minimum volume of structural and actuator material, thus restricting the allowable mechanical stroke and retrace clearances. Such embodiments of the present invention are made with housing and shaft materials having linear thermal expansions sufficiently well matched to that of the actuator bodies that differential expansion in a operating temperature range specified by a particular application allows sufficient retrace clearance and sufficient forcing stroke. Furthermore, piezoelectric embodiments may be constructed without ferromaganetic material for applications in which an intense magnetic field would render most electromagnetic motors useless. These embodiments would also be difficult to detect and locate by magnetic sensing.

The present invention has been described in terms of piezoelectric embodiments, but it must be understood that other types of actuators may be used to operate the smooth walking traction motor. For example, electromagnetic forces may replace electrostatic forces in one or more actuator portions. Electromagnetic actuators include those having absolute magnitude of force (rectifying) and those having linear magnitude of force (bipolar).

Absolute magnitude of force includes the attraction of a current carrying member to a nearby body of material that has a magnetic permeability greater than one, the mutual attraction of two nearby wires carrying current in the same direction, and the mutal repulsion of two nearby wires carrying current in opposite directions. These types of magnetic actuators, such as solenoids for example, exert a force without regard to the polarity of one of the currents. The degree of linearity of force with respect to current varies with device geometry. Generally, the same sense of force results from either direction of current flow. Application of Fourier stimulation to this class of actuators requires modification to achieve bipolar and symmetric mechanical strokes.

Linear magnitude of force actuators include voice coils and devices that use ancillary standing magnetic fields, such as field coils and permanent magnets. These devices provide a push with positive current direction and a pull with negative current. Fourier drive is applicable to those devices because they are generally linear, biploar, and symmetric.

A clear distinction between electromagnetic and electrostatic embodiments of the present invention involves the generation of constant force. All known electromagnetic embodiments, excluding mechanical latching devices, require a constant flow of current to maintain a constant force. In contrast, electrostatic embodiments store an electric charge so that the application of force persists without further electrical power input. Another distinction between electrostatic and electromagnetic embodiments involves reductions in electric efficiency due to eddy currents. Electrostatic embodiments have insignificantly small eddy currents because magnetic fields due to current flow are relatively weak and ferromagnetic components are not used. In contrast, electromagnetic embodiments suffer from significant energy dissipation and internal heating as a result of eddy currents.

All piezoelectric embodiments and the class of linear force electromagnetic embodiments are reciprocal; that is, motors can become generators when the direction of mechanical power delivery is reversed. However, these embodiments are not completely reciprocal because axiers still need activation when a motor is operated as a generator. However, generator electrical efficiency is relatively high when a Fourier drive is used. The power used by axier activation becomes negligible when the loop current dissipation is reduced to insignificant levels by using low impedance current paths.

Although the present invention has been described with respect to specific embodiments thereof, various changes and modifications may be suggested to one skilled in the art. Therefore, it is intended that the present invention encompass such changes and modifications as fall within the scope of the appended claims.

I claim:

1. An electric traction motor, comprising:
   a motor housing;
   at least one pair of actuators disposed inside said housing;
   activatable to provide cyclical walking traction wherein each of said actuators comprises a tangentially acting segment attached to said housing and a pair of opposing axially acting segments attached to said tangentially acting segment;
   a motor shaft extending inside said housing having a flange attached thereto, wherein said flange comprises a disk-shaped rotor and said shaft extends from an axis of rotation of said rotor, said rotor engagable by said actuators for rotation of said rotor and shaft.

2. The electric traction motor of claim 1, wherein said tangentially acting segment and said axially acting segments comprise layers of piezoelectric material.

3. The electric traction motor of claim 2, further comprising means for placing said piezoelectric material under compression.

4. The electric traction motor of claim 1 wherein the axially acting segments have traction members attached for engaging the flange on the shaft.

5. An electric traction motor, comprising:
   a motor housing;
   at least one pair of actuators disposed inside said housing; wherein each of said actuators comprises a tangentially acting segment attached to said housing and a pair of opposing axially acting segments attached to said tangentially acting segment;
   a motor shaft extending inside said housing;
   a flange attached to said shaft said flange comprising a disk-shaped rotor having an axis of rotation and said shaft extends from said rotor along said axis of rotation, said rotor engagable by said actuators for rotation of said rotor and shaft;
   said pair of actuators activatable to provide cyclical walking traction in contact with said flange, thereby moving and positioning said shaft.

6. The electric traction motor of claim 5, wherein said tangentially acting segments and said axially acting segments comprise layers of piezoelectric material.

7. The electric traction motor of claim 5 wherein the axially acting segments have traction members attached for engaging the flange on the shaft.

8. A rotary electric traction motor, comprising:
   a motor housing having a generally cylindrical interior;
   a plurality of actuator pairs attached inside said housing and positioned symmetrically around said cylindrical interior;
   each of said actuators having a tangentially acting segment attached to said housing and a pair of opposing axially acting segments attached to said tangentially acting segment;
   a disk-shaped rotor disposed inside said housing and engagable by said opposing axially acting segments of said actuators;
   a motor shaft connected to said rotor and extending from said housing along an axis of rotation of said rotor;
   said axially acting segments activatable to alternately engage and release said rotor, and said tangentially acting segments activatable to provide cyclical traction to rotate said rotor by walking action.

9. The electric traction motor of claim 8, wherein said tangentially acting segments and said axially acting segments comprise layers of piezoelectric material.

10. The electric traction motor of claim 8 wherein the axially acting segments have traction members attached for engaging the flange on the shaft.

11. An electric traction motor, comprising:
    a motor housing;
    at least one pair of actuators attached to said housing each actuator comprises a tangentially acting segment attached to said housing and a pair of opposing axially acting segments attached to said tangentially acting segment;
    a motor shaft alternately engagable by said actuators for moving and positioning said shaft.

12. The electric traction motor of claim 11, wherein said axially acting segments and said tangentially acting segment employ shear deformation only.

13. The electric traction motor of claim 11, wherein said shaft includes a flange attached thereto, said flange engagable by said actuators to move and position said shaft.

14. The electric traction motor of claim 13 wherein the axially acting segments have traction members attached for engaging the flange on the shaft.

15. The electric traction motor of claim 13 wherein said flange comprises a disk-shaped rotor and said shaft extends from an axis of rotation of said rotor, said rotor engagable by said actuators for rotation of said rotor and shaft.

16. The electric traction motor of claim 11 where the actuators positioning the shaft fulfill the function of bearings by providing all shaft guidance means.

* * * * *